(12) United States Patent
Becherucci et al.

(10) Patent No.: US 6,353,986 B1
(45) Date of Patent: Mar. 12, 2002

(54) METHOD FOR MANUFACTURING ARMATURES

(75) Inventors: Raffaele Becherucci, Florence; Carlo Domenichini, Siena, both of (IT)

(73) Assignee: Axis USA, Inc., Tampa, FL (US)

( * ) Notice: Subject to any disclaimer, the term of this patent is extended or adjusted under 35 U.S.C. 154(b) by 0 days.

(21) Appl. No.: 09/179,527

(22) Filed: Oct. 27, 1998

Related U.S. Application Data (60) Provisional application No. 60/064,221, filed on Oct. 29, 1997.

(51) Int. Cl.⁷ .................................................. B23P 23/00
(52) U.S. Cl. ...................... 29/401.1; 29/407.09; 29/430; 29/596; 29/711; 29/783; 29/791
(58) Field of Search .............................. 29/732, 407.04, 29/407.09, 430, 596, 401.1, 711, 783, 784, 791, 799; 198/340

(56) References Cited

U.S. PATENT DOCUMENTS

| | | | | |
|---|---|---|---|---|
| 3,530,571 A | * | 9/1970 | Perry | 29/563 |
| 3,842,496 A | * | 10/1974 | Mercer | 29/624 |
| 3,854,889 A | * | 12/1974 | Lemelson | 29/33 P |
| 4,503,596 A | | 3/1985 | Ida et al. | 29/568 |
| RE31,945 E | * | 7/1985 | Magni | 198/341 |
| 4,815,673 A | * | 3/1989 | Wheeler | 242/7.09 |
| 4,965,924 A | * | 10/1990 | Santandrea et al. | 29/596 |
| 4,982,827 A | | 1/1991 | Seitz et al. | 198/341 |
| 4,984,353 A | | 1/1991 | Santandrea et al. | 29/714 |
| 5,025,997 A | * | 6/1991 | Shi et al. | 242/1.1 R |
| 5,063,279 A | | 11/1991 | Rossi | 219/86.51 |
| 5,093,977 A | * | 3/1992 | Muller et al. | 29/568 |
| 5,152,050 A | * | 10/1992 | Kaczmarek et al. | 29/711 |
| RE34,195 E | | 3/1993 | Santandrea et al. | 29/734 |
| 5,300,753 A | | 4/1994 | Rossi | 219/110 |
| 5,353,495 A | * | 10/1994 | Terabayashi et al. | 29/714 |
| 5,383,619 A | | 1/1995 | Cardini et al. | 242/7.05 B |
| 5,386,621 A | * | 2/1995 | Fluegge et al. | 29/705 |
| 5,474,166 A | | 12/1995 | Santandrea et al. | 198/345.3 |
| 5,653,014 A | | 8/1997 | Faraoni et al. | 29/732 |
| 5,680,696 A | | 10/1997 | Bonura et al. | 29/732 |
| 5,781,988 A | * | 7/1998 | Faraoni et al. | 29/735 |
| 5,823,316 A | * | 10/1998 | Shaw et al. | 198/341 |
| 5,829,572 A | | 11/1998 | Faraoni et al. | 198/346.1 |
| 5,845,392 A | * | 12/1998 | Cardini et al. | 29/736 |
| 5,926,941 A | * | 7/1999 | Neri et al. | 29/598 |
| 5,967,288 A | | 10/1999 | Faraoni et al. | 198/346.2 |
| 5,992,009 A | * | 11/1999 | Bonura | 29/732 |
| 6,061,899 A | * | 5/2000 | Cardini et al. | 29/736 |

* cited by examiner

Primary Examiner—S. Thomas Hughes
Assistant Examiner—Essama Omgba
(74) Attorney, Agent, or Firm—Fish & Neave; Robert R. Jackson; James A. Leiz (57) ABSTRACT

Apparatus and method for manufacturing armatures according to a first and a second configuration is provided. An information storage device associated with one of the components is provided to store information corresponding to one of the first and second configurations. A processing station is provided which is capable of performing a first processing step corresponding to the first configuration and a second processing step corresponding to the second configuration. The processing station is arranged to perform one of the processing steps according to the information stored in the information storage device. Changeover from a batch of first configuration components to a batch of second configuration components is achieved by delaying departure of processed second batch components from the processing station until all first batch components have been processed and have departed.

33 Claims, 6 Drawing Sheets

METHOD FOR MANUFACTURING ARMATURES

CROSS-REFERENCE TO RELATED APPLICATIONS

This application claims the benefit of United States provisional patent application No. 60/064,221, filed Oct. 29, 1997.

BACKGROUND OF THE INVENTION

This invention relates to systems for manufacturing components of electric motors and particularly for manufacturing armatures with coils connected to commutators.

Figure 1:
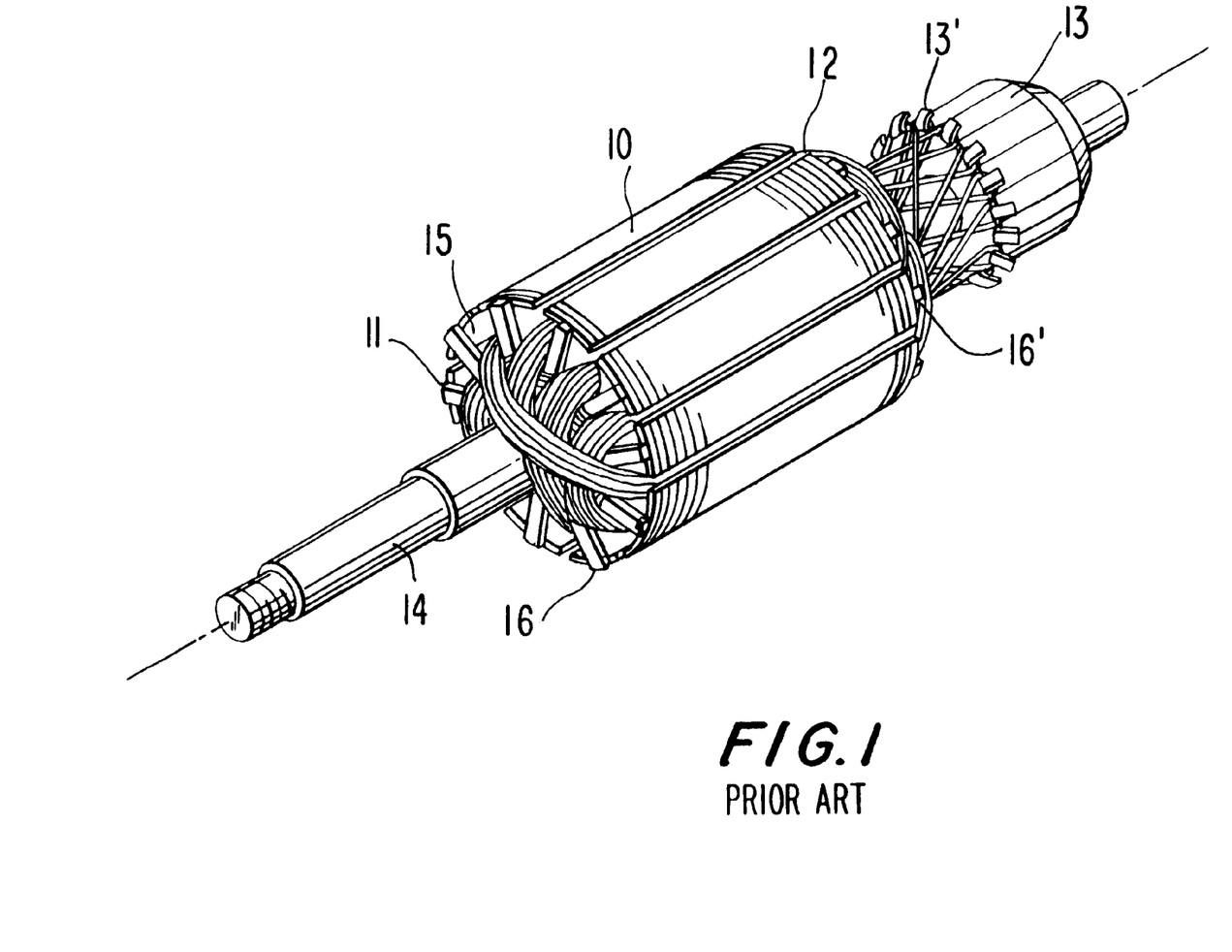
FIG. 1 is a simplified perspective view of the prior art apparatus.

A typical armature known in the art is shown in FIG. 1. Armature 1 is provided a lamination stack 10, wherein coils 11 are wound in slots 12. Leads of the coils 11 are connected to tang members 13' of commutator 13. The lamination stack 10 and the commutator 13 are mounted co-axially on shaft 14. The slots 12 are provided with insulation inserts 15 for insulating the innermost turns of the coils 11 from the metal surface of lamination stack 10. Insulation boards 16 and 16' are also provided in abutment with the end faces of the lamination stack 10 to insulate between external portions of the coil turns and the lamination stack.

Figure 2A:
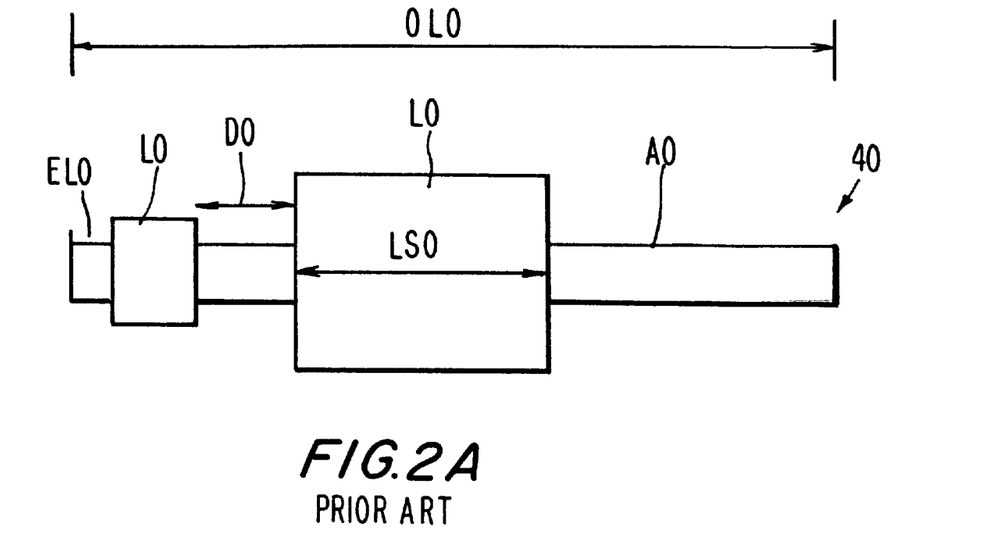
FIG. 2(a) is a simplified schematic view of a first exemplary configuration of a prior art apparatus.
Figure 2B:
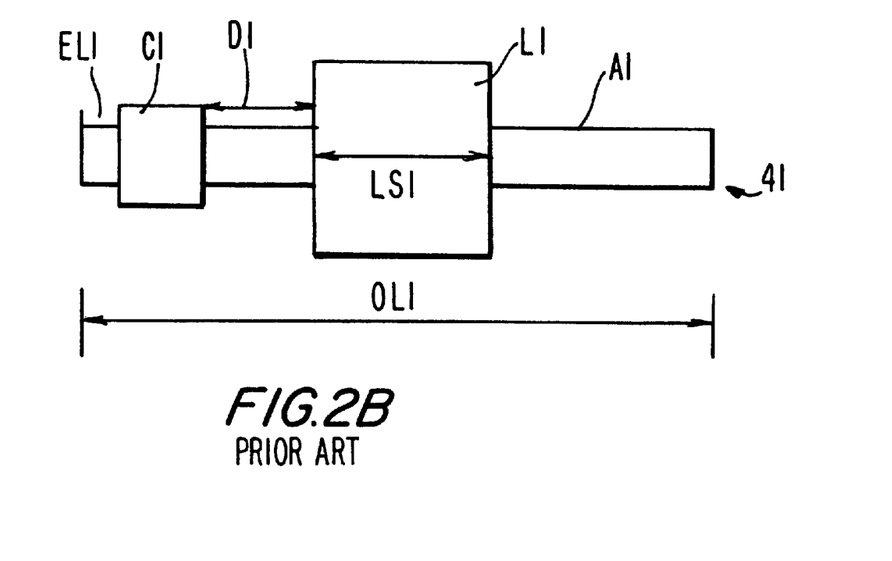
FIG. 2(b) is a simplified schematic view of a second exemplary configuration of a prior art apparatus.

The specifications and dimensions of these armature components will be suggested by the particular applications in which the armature will be used. FIGS. 2(a) and 2(b) illustrate some of the different armature configurations possible. Typically, armatures having similar or identical configurations are manufactured in groups, or batches. A group of armatures having a first configuration will be referred to herein as a first batch, and a group of armatures having a different configuration will be referred to herein as a second batch. In the description that follows, an exemplary configuration of a first batch is represented by armature 40 and illustrated in FIG. 2(a), and an exemplary configuration of a second batch is represented by armature 41 and illustrated in FIG. 2(b).

Armatures 40 and 41 may have certain specifications in common. For example, both armatures may have the same type of commutator C0 and C1, and may use single laminations to form the stacks. In addition, the following dimensions may be the same for both armature configurations: the diameter of the shafts A0 and A1, the distance D0 and D1 existing between the commutators and the lamination stacks L0 and L1, and the distances EL0 and EL1 between the end of the shafts and the commutators. However, armatures 40 and 41 may be provided in this example with different overall lengths OL0 and OL1, and perhaps other dimensional differences, different lamination stack lengths LS0 and LS1, and different size of wire used to wind the coils.

In order to manufacture armatures having different specifications in successive batches, each machine, or station, used to perform a manufacturing step must be converted from the first configuration to the second configuration. The conversion process is time consuming and typically requires that the assembly line be temporarily stopped. Furthermore, since each station may require a different amount of time to perform each manufacturing step, the timing of the conversion of each station between batches is critical and a complicated process.

It is therefore an object of the invention hereinafter claimed to provide methods and apparatus for converting an assembly line having a plurality of stations from manufacturing components having a first configuration to a second configuration.

It is a further object of the preferred embodiments of this invention to provide methods and apparatus for manufacturing armatures which permits the assembly of a first batch of armatures having a first configuration and a second batch of armatures having a second configuration in succession and with a reduced loss in the line's output of armatures when there is a conversion between the various batches.

SUMMARY OF THE INVENTION

In one aspect, the invention provides a method of converting a manufacturing line for dynamo-electric machine components from manufacturing a first batch of components having a first configuration to manufacturing a second batch of components having a second configuration, the line comprising a plurality of processing stations, at least one of which performs a first processing step on first batch components and a second processing step on second batch components, means for conveying the components a synchronously from station to station, and means for identifying at least the leading component of the second batch of components so being conveyed, the method comprising conveying second batch components to said one station, and conveying second batch components upon which the second processing step has been performed from said one station only when all first batch components have been conveyed from said station.

In another aspect the invention provides a manufacturing line for dynamo-electric machine components which is convertible from manufacturing a first batch of components having a first configuration to manufacturing a second batch of components having a second configuration, the line comprising a plurality of processing stations, at least one of which performs a first processing step on first batch components and a second processing step on second batch components, means for conveying the components a synchronously from station to station, means for identifying at least the leading component of the second batch of components being conveyed, and means configured to control the conveying of components from the said one station so that second batch components upon which the second processing step has been performed are conveyed from said one station only when all first batch components have been conveyed from said station.

The invention may be utilized in preferred form in a manufacturing line capable of producing more than one configuration of the armatures like the type shown in FIG. 1. More particularly, the manufacturing line of this invention is capable of converting itself, automatically to manufacture different armature configurations. The scenario which results from using the line of the invention is that of an armature manufacturing environment producing batches of differently configured armatures, in succession and with a minimum loss in the line's output of armatures when there is a conversion between the various batches.

The apparatus for manufacturing dynamo-electric machine components according to a first configuration and a second configuration includes an information storage device associated with one of the components for storing information corresponding to one of the first and the second configurations. The apparatus also includes a processing station (e.g., 24) capable of performing a first processing step corresponding to the first configuration and a second processing step corresponding to the second configuration. The processing station is arranged to perform one of the processing steps on the component according to the information stored in the information storage device.

In a preferred embodiment, the processing station has a queue for storing a plurality of components. The processing station may have a first machine and a second machine for performing processing steps on the components. The processing station may also be provided with a transfer device responsive to the information storage device configured to direct the components according to the first configuration to the first machine, and to direct components according to the second configuration to the second machine.

Novel methods for manufacturing dynamo-electric machine components are disclosed, which include providing an information storage device associated with one of the components for storing information corresponding to one of the first and the second configurations, and providing a processing station capable of performing a first processing step corresponding to the first configuration and a second processing step corresponding to the second configuration. The method includes reading the information stored in the information storage device, and performing one of the processing steps on the component corresponding to the configuration information stored in the information storage device.

BRIEF DESCRIPTION OF THE DRAWINGS

The above and other features of this invention, its nature, and various advantages will be apparent from the following detailed description of the preferred embodiments, taken in conjunction with the accompanying drawings, in which like reference characters represent like elements throughout, and in which.

DETAILED DESCRIPTION OF THE PREFERRED EMBODIMENTS

Figure 3:
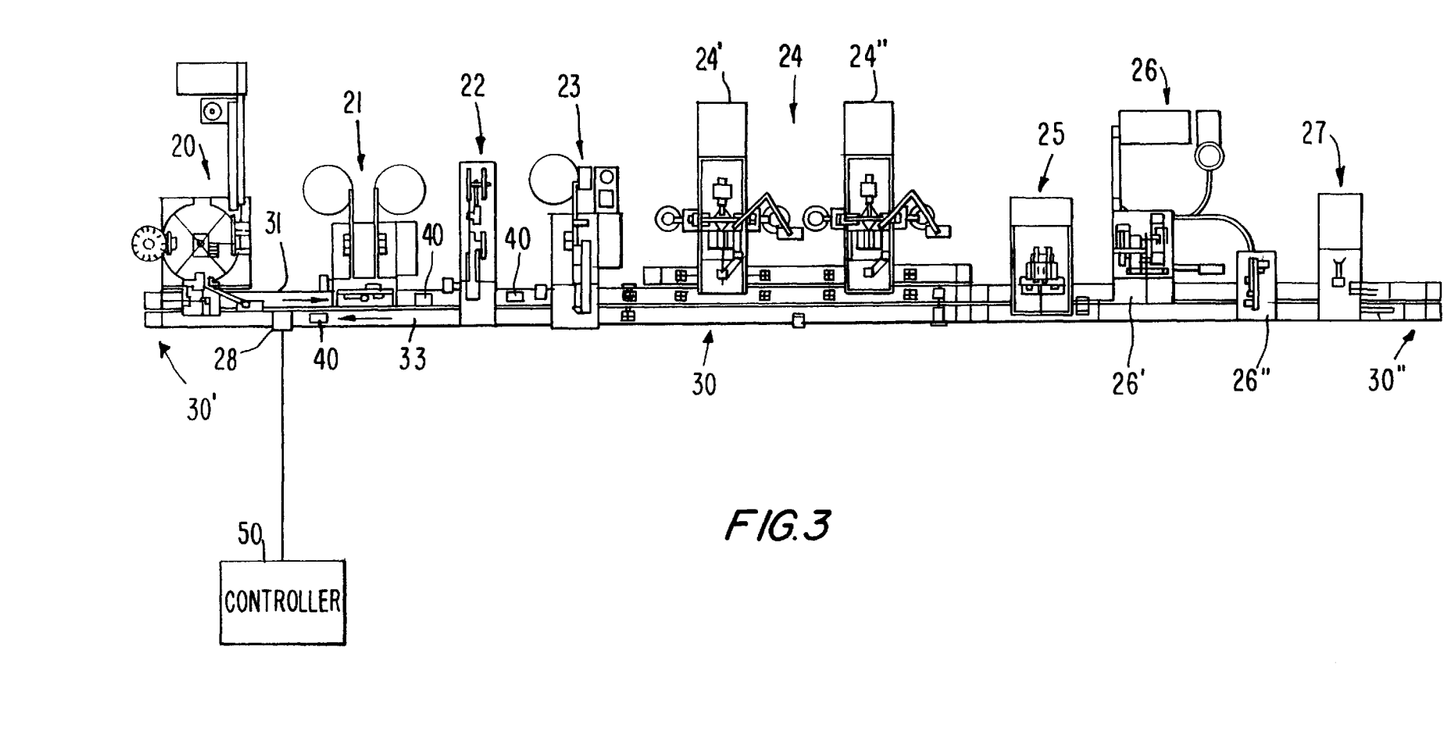
FIG. 3 is a simplified schematic view of an embodiment of the subject invention.

Referring now in detail to the drawings, a preferred embodiment of the subject armature manufacturing apparatus is illustrated in FIG. 3. The manufacturing line of the invention will have several automatic conversions of the stations, in order to process two armature configurations, such as those shown in FIGS. 2(a) and 2(b).

FIG. 3 is a schematic representation of the line according to this invention. With reference to this Figure, a conveyor system 30 transports armature components to each of the stations 20, 21, 22, 23, 24, 25, 26 and 27 described in greater detail below. The transportation of armature components by conveyor system 30 is asynchronous, as will be described in greater detail below. Each machine of these stations can be positioned along conveyor system 30. The position of the machines along the line is sequential and according to the order in which assembly operations of the machine, are required. Although the stations are often described with reference to other patent applications of the applicant, reconfigurable stations as already known per se may be used, the present invention lies in the control and operation of the line rather than the detail of the processing steps performed by the individual stations.

Conveyor track 31 carries the armature component supported on pallets 40 to each processing station, from which components are removed for processing and to which processed components are returned. Return track 33 is present to return empty pallets 40 to the beginning of conveyor track 31 to once again convey components through the system. It will be understood that any other means for transporting components (or pallets) between the processing machines in the system may be used.

Station 20 is provided with a machine capable of producing an armature subassembly consisting of shaft 14 press fitted into lamination stack 10. As described above, the variations between the first and the second configurations can be, for example, in the size of the lamination stack used, in the dimensions of the shaft, and in the distance for press fitting the shaft into the lamination stack. This machine is capable of converting itself to produce armature subassemblies consistent with the particular configuration of a batch which is to be processed by the line. (As will be described below, such conversion may occur automatically.) More particularly, the conversion may refer to the rearrangement of internal machine components to manipulate parts, i.e., the stack or the shaft, having different dimensions. Alternatively, the conversion may refer to accessing a different supply of components. The conversion allows the machine to perform processing steps on armature subassemblies according to a number of different batch configurations. In order to simplify the description which follows, the machine may be considered to be in a "first arrangement" when it has converted itself to produce subassemblies according to the first configuration. Similarly, the "first processing step" may refer to any single step or collectively to several or all of the various manipulations of any kind on the subassembly that are performed by the machine in the first arrangement. Likewise, to manufacture subassemblies according to the second configuration, the machine shall be converted to a "second arrangement" to perform the "second processing step." The above description is applicable to the stations, described below, that are capable of converting to different arrangements.

More particularly, station 20 may have to select different numbers of laminations to account for the differences between lengths LS0 and LS1 of two different configurations (See, FIGS. 2(a)–2(b)). This may be achieved by having a programmable receiver platform beneath the drop of the laminations (not shown). In a first arrangement, the receiver will place itself at the programmable height corresponding to LS0, or to LS1 in a second arrangement, to receive the correct number of laminations. Also, in Station 20 the supply of the shafts may have to be adapted for the conversion from the first arrangement to the second arrangement.

Station 21 is provided with a machine for assembly of the insulation boards 16 and 16' (often referred to as end fibers in the field of electric motor manufacturing). The machine in station 21 is capable of automatically converting itself to perform a processing step according to the configuration of the batch which is required. For example, the machine in station 21 may be in a first arrangement to perform a first processing step including assembly of the specific insulation board which is required by the batch, and correctly orienting the insulation boards against the end faces of the lamination stack. For a different batch, the machine at station 21 may be converted to a second arrangement and perform a second processing step including a different insulation board or a different orientation of the board.

Station 22 is provided with a machine for inserting insulation lining in the slots of the armature in order to form an insulation barrier between the innermost coil turns and the lamination stack. Machines for performing this task have been presented in commonly-assigned U.S. Pat. Nos. Re. 34,195 and 5,720,097 and co-pending U.S. application Ser. No. 08/998,045, which are incorporated by reference herein. The machine of station 22 is capable of automatically converting itself to insert a required insulation lining which matches the slot configuration of the lamination stack and the end fibers which have been assembled previously. Therefore, station 22 for insulating the slots will, for example, adapt itself to a particular arrangement to cut lengths of insulation material to suit armature lengths LS0 and LS1, corresponding to the batch configuration (See, FIGS. 2(*a*)–(*b*)).

Station 23 is provided with a machine which assembles commutator 13 on shaft 14 of the armature, by press fitting, for example. The machine of station 23 is capable of automatically converting itself to an arrangement, wherein the processing step may include selecting the type of commutator which is required by the batch being processed, placing the commutator along the shaft of the armature at a specified shaft distance, and providing the particular angular orientation of the tangs of the commutator with respect to the position of the slots of the lamination stack. According to a different batch configuration, the machine of station 23 may be in a different arrangement to perform a different processing step, as required for that armature batch.

Station 24 is provided with winders 24' and 24" to wind coils in slots 15 of the lamination stack and to connect leads to the commutator. Each of the winders of station 24 can automatically convert itself, independently from the others, to wind and to make such connections for the particular configuration of the batch which needs to be manufactured. For example, each of the two winders 24' and 24" may have multiple indexing devices (e.g. on a rotatable platform) that can move into and out of the winding area. While one indexing device is inside the winding area (i.e. shielding the commutator and supporting and rotating the armature being wound), the others are outside the winding area so that they may be adjusted to accommodate armatures of different dimensions. When an armature of different dimensions is presented to the winder, it may simply move the current indexing device out of the winding area and move one of the other pre-adjusted indexing devices into the winding area. In this way the new armature and commutator can be matched with an indexing device that provides the proper shielding, support and rotation. Dimensions which may vary between batches for these winders may be any of the following: the size of the wire which needs to be wound, the lamination stack configuration, the commutator configuration, the shaft sizes, and the winding schemes. Wire changing and conversion for winding different lamination stacks have been presented in commonly-assigned, copending U.S. patent application Ser. Nos. 09/019,222 and 09/056,159, which are incorporated by reference herein.

For example, the winders in station 24 will have to change shrouds, wire spools and distance at which the armatures are held with respect to the shrouds in order to cope with the variations in armature lengths LS0 and LS1 (FIGS. 2(*a*)–(*b*)) and variations in the wire sizes. Even the fusing machine in station 25 and the testing machine in station 26 will be adapted, by changing the programs which they apply, to satisfy the different configuration requirements of FIGS. 2(*a*)–(*b*).

Station 25 is provided with a fusing machine to fuse the leads of the coils to the tangs 131 of the commutator 13. This machine may be configured to automatically convert itself to fuse different lead and tang configurations. Examples of variations for which the fusing machine can automatically convert itself include wire size, tang size and the geometry of the support which maintains the armature in place during fusing. U.S. Pat. Nos. 5,063,279, 5,300,753 and 5,383,619, which are incorporated by reference herein, provide disclosures concerning the conversion of a fusing machine to process armatures having such changes.

Station 26 is provided with a lathe machine 26' for cutting the commutator to required roundness and concentricity with respect to the shaft of the armature. The lathe machine may be configured to automatically convert itself to obtain the required roundness and concentricity tolerances for the particular commutator of the batch being processed. A machine 26" for brushing the commutator may also be present at this station for removing chips that have been produced during the cutting process of the lathe machine, and that may remain on the commutator. Brushing machines have been presented in U.S. patent application Ser. No. 08/552,560, which is incorporated by reference herein, with solutions to allow automatic conversion to brush the particular commutator type for a manufacturing batch.

Station 27 is a station for testing the electrical characteristics of the armature once it has been completely processed by the line. The equipment of station 27 may be configured to automatically convert itself to test the various parameters which are of interest for the particular configuration of the last batch produced by the line.

With continued reference to FIG. 3, each machine of these stations can be positioned along conveyor system 30. The position of these machines along the line is sequential and according to the order in which the assembly operations of the machines are required. The armatures are transported to these machines on pallets moved by conveyor system 30.

More particularly, empty pallets coming from return track 33 (FIG. 5) are diverted to conveyor track 31 which supplies them, one after another to station 20. At station 20, each empty pallet receives a subassembly consisting of the lamination stack assembled on the shaft. The pallets carrying the subassemblies move to station 21 by means of track 31. At station 21, assembly of the insulation boards occurs in succession for each pallet which arrives from station 20. Each subassembly of the pallets in presented to station 21 by removing it from the pallet, undergoes processing while off the pallet and then returns back to the same pallet on which it arrived so that it can reach successive station 22. These process and handling principles described for station 21 are applied again at stations 22 and 23 to process the sub assemblies and moving them to downstream stations.

Figure 4:
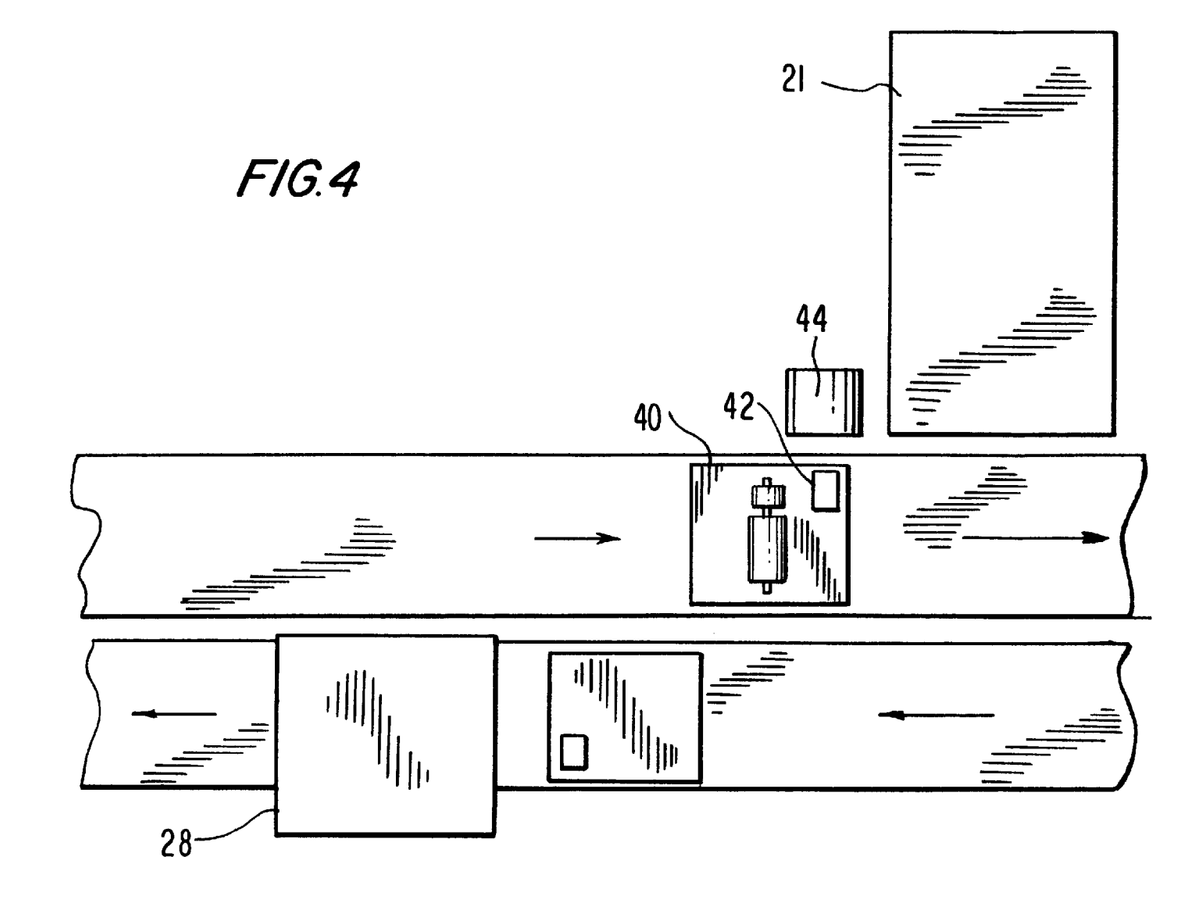
FIG. 4 is an enlarged schematic view of a portion of the apparatus of FIG. 3.

An enlarged view of the winding station 24 is illustrated in FIG. 4. At winding station 24, there may be a plurality of winders working in parallel, because these are typically the slowest machines of the line. A pallet 39 carrying a subassembly that needs to be wound enters the winding area by means of track 31, and becomes routed to a queue track of a winder that has a free location to receive it. For example, the pallet 39 is diverted from track 31 to one of the queue tracks 32' or 32" in front of winder 24' or 24", respectively, depending on which queue track is found first with a free place. If a pallet with a subassembly to be wound finds both queue tracks 32' and 32" occupied, then the pallet 39 is moved to return track 33 by pallet transfer device 35*a* at location 35. The return track 33 brings this pallet back to pallet transfer device 34a at location 34, where it is returned to track 31 to try again to find a place in the queue tracks of the winders.

Pallets with subassemblies which have just been wound by winders 24' or 24" return to track 31 by means of pallet transfer devices 32'b or 32"b and proceed on this same track to reach the remaining downstream stations 25–27 of the line. The pallets of the line may be configured and used according to the principles of U.S. Pat. No. 5,060,781, which is incorporated by reference herein, so that the armature subassemblies are suitably transported, correctly loaded and unloaded with respect to the pallet and able to be worked on while on the pallet, if a station foresees this.

With reference to FIG. 3, at the end of the line 30", following station 27, the armatures are in a completed condition and therefore can be unloaded from the pallets and sent to other manufacturing processes concerned with final assembly of the electric motor. The pallets at location 30", when empty, go to return track 33 which returns them to the beginning of the line at location 30'. At location 30", the empty pallets are returned to track 31 for receiving new subassemblies at station 20. To receive new subassemblies having a different configuration due to a batch change, the pallets can be adjusted at pallet adjustment station 28 on return track 33, according to the principles described in U.S. Pat. No. 5,060,781, incorporated by reference above.

Prior to starting conversion of the line to manufacture a new batch having a different configuration (second batch in the example) and while still manufacturing a present batch (first batch in the example), the operator of the line can prepare and make available to the machines, without stopping them, the storage devices of components which will be needed to form the subassemblies relating to the second batch. During this same period, the operator should also make available to the machines different tooling which may be needed when the conversion for the second batch occurs.

For example, station 20 may require different shafts or different lamination piles, station 21 may require different end fibers, station 22 may require different slot lining material, station 23 may require different commutators, station 24 may require different wire spools and different winding guides. Wire spools has been the subject of commonly-assigned, copending U.S. patent application Ser. No. 09/019,222, incorporated by reference above. Changing of the winding guides to obtain automatic conversion of the winder has been the subject of U.S. patent application Ser. No. 09/056,159, incorporated by reference above.

To initiate the manufacture of the second batch, an external command can come from a source such as a push button consent given by the operator of the line. Following this consent, a central controller 50 of the manufacturing line dialogues with the pallet adjustment station 28 to cause adjustment to meet the second batch requirements. Following this command until there is the conversion to another batch, the adjustment occurs for all the unconverted empty pallets which are returning to the beginning of the line in 30' by means of return track 33.

At least the very first pallet 40 which becomes adjusted for the second batch configuration is marked on an information storage device, or memory 42, which it is carrying. (See, FIG. A.) The marking can be achieved by an electromagnetic writer to show that the pallet 40 is carrying an armature according to the configuration of the second batch. Alternatively, the marking can be any electromagnetic, optical, mechanical or other marking means known in the art, The writer or other marking apparatus may be located at station 28 on return track 33. (It is understood that the memory 42 and its placement on the pallet are exemplary. It is contemplated that memory 42 or other information storage device may be positioned at any appropriate location on the pallet, or on the armature component itself.)

Figure 5:
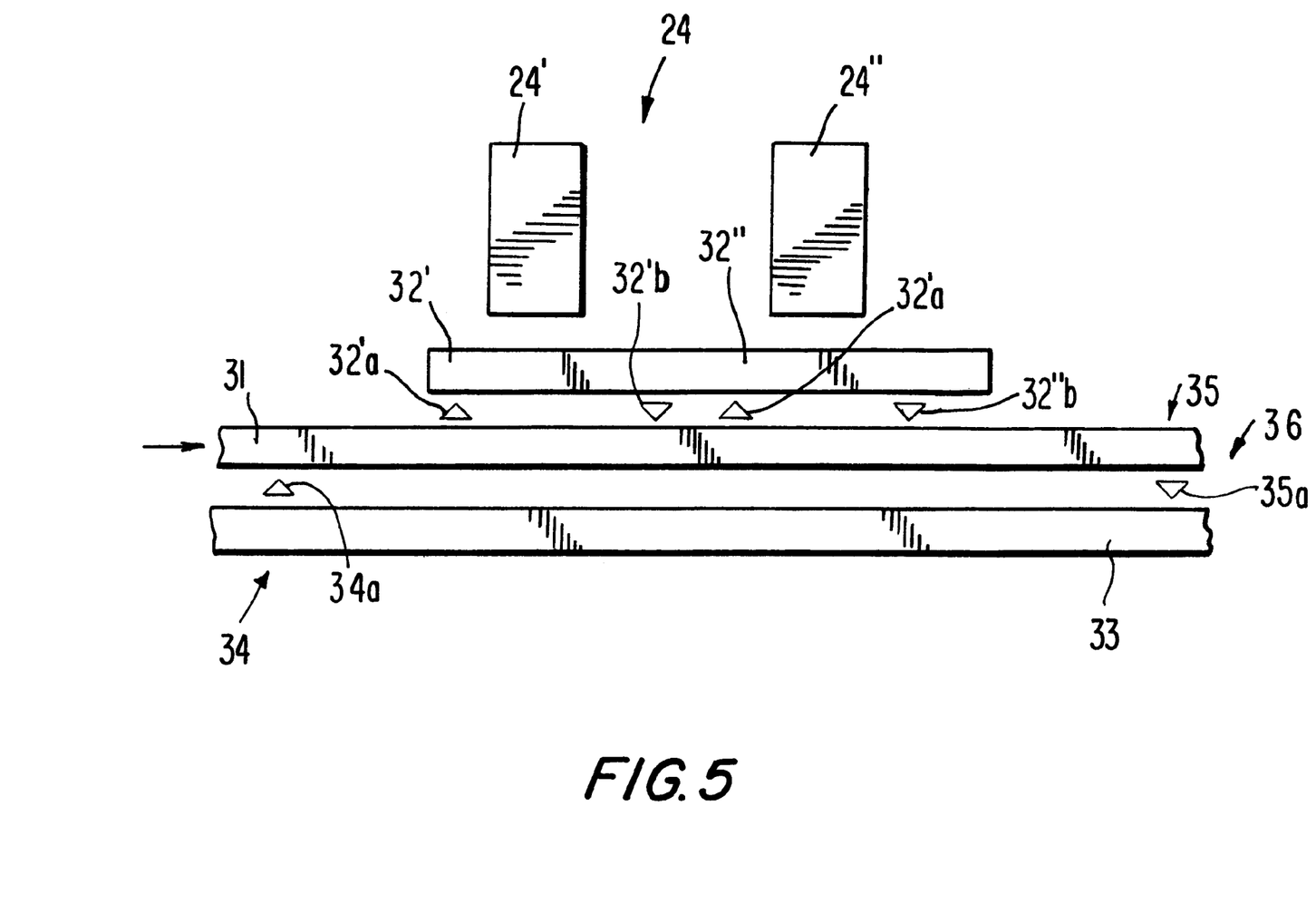
FIG. 5 is an enlarged schematic view of a different portion of the apparatus of FIG. 3.

With continued reference to FIG. 5, pallet 40 reaches the beginning of the line 30', and begins to travel on track 31. This pallet 40 becomes the first pallet of the second batch to arrive in station 20. Here, the marking on the pallet 40 is read by a reader (not shown) to indicate to the machine in station 20 to automatically convert itself to manufacture subassemblies according to the configuration of the second batch. This first pallet waits at station 20 until it has received a subassembly consistent with the configuration of the second batch. Once this has occurred, the pallet travels to the next machine of the line, which typically is at station 21, where it is stopped, and again a reader 44 reads the marking present on the memory 42 of the pallet 40 (FIG. 4). The reading allows the machine of station 21 to convert itself to manufacture the armatures of the second batch, conversion of subsequent machines in stations 20 and 22–27 occurs in substantially the same way.

By using these operating principles, the pallets following the first pallet of the second batch find the machines at stations 20–23 already converted and ready to process the subassemblies according to the second batch configuration.

Either of two operation solutions can be applied to allow the first pallet of the second batch and the others which follow to reach winders of station 24 in order to wind the respective armature subassemblies which they are carrying. More generally, the following operating solutions are applicable to stations having at least two machines operating in parallel and a routing system for directing pallets to an available one of the two machines.

A first solution may be to direct the first pallet of the second batch to a prescribed winder of the station. (There may be a reader positioned at the entry location of station 21, or adjacent pallet transfer device 32'a.) Initially, winders 24' and 24" may operate to wind subassemblies of the first batch which can be in the queues on track 32' and track 32", respectively (FIG. 5). According to the first solution, the first pallet of the second batch will travel along so track 21 and then be directed to queue up on track 321 in front of the winder 241. As this pallet comes nearer to its turn to be wound on track 32', while pallets of the first batch are still queued up, other pallets of the second batch will queue up on track 32' behind the first pallet. At the same time winder 24" will continue to operate to wind subassemblies of the first batch which can be in the queue on track 32", still traveling on track 31 or returning to find winder 24" by means of track 33.

When the first pallet of the second batch reaches its turn to be wound, the marking in the memory is read by a reader associated with winder 241 to cause winder 24' to convert itself to wind the configuration of the second batch.

Pallet transfer devices 32'a and 32"a, can divert, respectively, the pallets of the second batch to the queue up in front of winder 24'and the pallets of the first batch to the queue up in front of winder 24". At these pallet transfer devices a distinction may be made between pallets of the two batches to consistently queue the pallets at the winders. Readers may be present at these locations to detect this distinction based on markings applied to the pallets. In a preferred embodiment, each of the pallets used on the line would have a memory device, and that specific marking to distinguish the pallet should take place when adjustment occurs at the pallet adjustment station 28. A marking device may be present at location 32'b or 32"b to mark the memory of the pallet with information concerning whether the components have been wound.

Until there is the occurrence of conditions more fully described below, only pallets having wound armatures of the first batch will be allowed to exit at location 33 to reach machines in the downstream stretch of the line by means of track 31. Other pallets will be transferred by pallet transfer device 35a to return track 33 in order to recirculate again on track 31. Again this can be accomplished by having a reader and station transfer device at location 35 which reads the memories of the pallets to discriminate between first and second batch pallets and between pallets of the first batch having wound or unwound armatures.

The example proposed above, where initially winder 24' is dedicated to the second batch is continued herein. From the instant that the first pallet of the second batch enters the winding area to be directed to a winder, periodic counting of the pallets of the first batch having unwound armatures traveling on track 31 (between locations 34 and 35) and on track 33 (again between locations 34 and 35) should be performed. Counting devices, similar to the reader 44, may be provided throughout the station, particularly at transfer locations 34a and 35a. The result of this count should be compared with a synchronized count of the number of pallets of the second batch which pass location 34 to enter the winding station on track 31. When the ratio between the count of pallets of the first batch and the Count of pallets of the second batch is zero, the pallets of the second batch can be allowed to queue up on track 32" in front of winder 24". The first of the pallets of the second batch which queue up on track 32" can cause winder 24" to be converted based on the reading of the memory by a reader associated with winder 24".

If the winding station has more than two winders, when converting a next winder after the first one, and before conversion of the last winder, the ratio of the counts between that of the first batch and the second batch should be compared with a threshold value that has to be higher than zero. In this case, the threshold value is related to proportioning the conversion of the winders to the proportion of the presence of pallets of the first batch with respect to the second batch. Thus, the conversion of the winders is progressive and a function of the presence of the pallets of the two batches present in the winding station.

Only when there is a total absence of pallets of the first batch on the three tracks of the winding area, pallets of the second batch having wound armatures can be allowed to pass location 35 to reach the downstream stretch of the line for processing by stations 25–27. Otherwise, these pallets of the second batch will recirculate between tracks 31 and 33 until this condition is met. As described above in the upstream stretch of the line, the first pallet of the second batch moving on track 31 will provide an indication to the machines of station 25–27 to convert themselves automatically for processing the required and related armature configuration.

A second solution for directing armatures in the winding area involves impeding the first pallet of the second batch from entrance into the winding area (consequently, all the pallets of the second batch will likewise be impeded), preferably just before location 34. This occurs until all the pallets of the first batch have left the tracks in front of the winders and are on the way to pass 35.

At the occurrence of this last condition, all the winders of station 24 may be converted at the same time to wind the second batch configuration of the pallets that had been stopped upstream of 34.

This second mode of operating the winding station is simpler to manage but can produce a longer discontinuity in the line's output between manufacturing of the first batch and the second batch.

In the conversion of the line between manufacturing the first batch and the second batch, particular operating principles are applied if certain stations process or handle multiple subassemblies at the same time. In a machine of a station having this prerogative, the subassembly, which is removed from a pallet to be processed, is not necessarily returned to the same pallet on which it arrived at the station. More precisely, this subassembly will return to a pallet only after all the subassemblies, already present in the machine, have been unloaded onto pallets arriving at the station to deliver other subassemblies awaiting processing. To obtain conversion of these stations, all the subassemblies of the first batch must leave the machine, and only after this, the machine can be converted to process subassemblies of the second batch. Thus, such a machine, before being converted, requires a supply of empty pallets in succession in order to remove all the processed subassemblies of the first batch.

Stations having machines that use these particular conversion principles may be the following: e.g., station 20 where there can be a high number of subassemblies present in the machine, station 24 where the loading/unloading device for transfer of the subassemblies between the winding machine and the pallet of the conveyor can have more than one subassembly, station 25 where the unloading/loading device between the fusing machine and the pallet of the conveyor also requires more than one subassembly, and station 26 in which various machines in succession, and working in parallel, can be present to accomplish the complete turning process.

When the line has stations like 20, 24, 25 and 26 requiring the supply of empty pallets to convert them, station 20 can be converted by having pallet adjustment station 28 allow a number of empty pallets of the first batch (equal to those required by station 20 to become empty) to pass before starting adjustment of pallets for the second batch. At the same time, the machine of station 20 will be commanded to stop producing subassemblies of the first batch and to finish those which are already present in the machines. The empty pallets of the first batch, which the adjustment station has allowed to pass, will be used to receive subassemblies to empty the machine of station 20.

Continuing along the line, at the winding station 24, empty pallets returning along track 33 and having the adjustment required for the first-batch can be allowed to enter track 31 at 34 to reach the winders. The number of empty pallets which will be allowed to enter will coincide with the number that the winder requires to empty, and thus to be converted. These empty pallets, if necessary each bearing an indication in its memory device that it is an empty-first pallet, will queue up on the tracks 32' and 32" associated with the winder that needs to be converted, and before placing in the queues those pallets having subassemblies of the second batch.

Also, an extra and predetermined number of empty pallets, with respect to those required to empty the winding machines, can be allowed to enter track 31 at 34 to obtain emptying of machines at stations 25 and 26. These extra pallets should be allowed to reach stations 25 and 26 only after the last pallet of the first batch reaches them and before pallets of the second batch do so.

Figure 6:
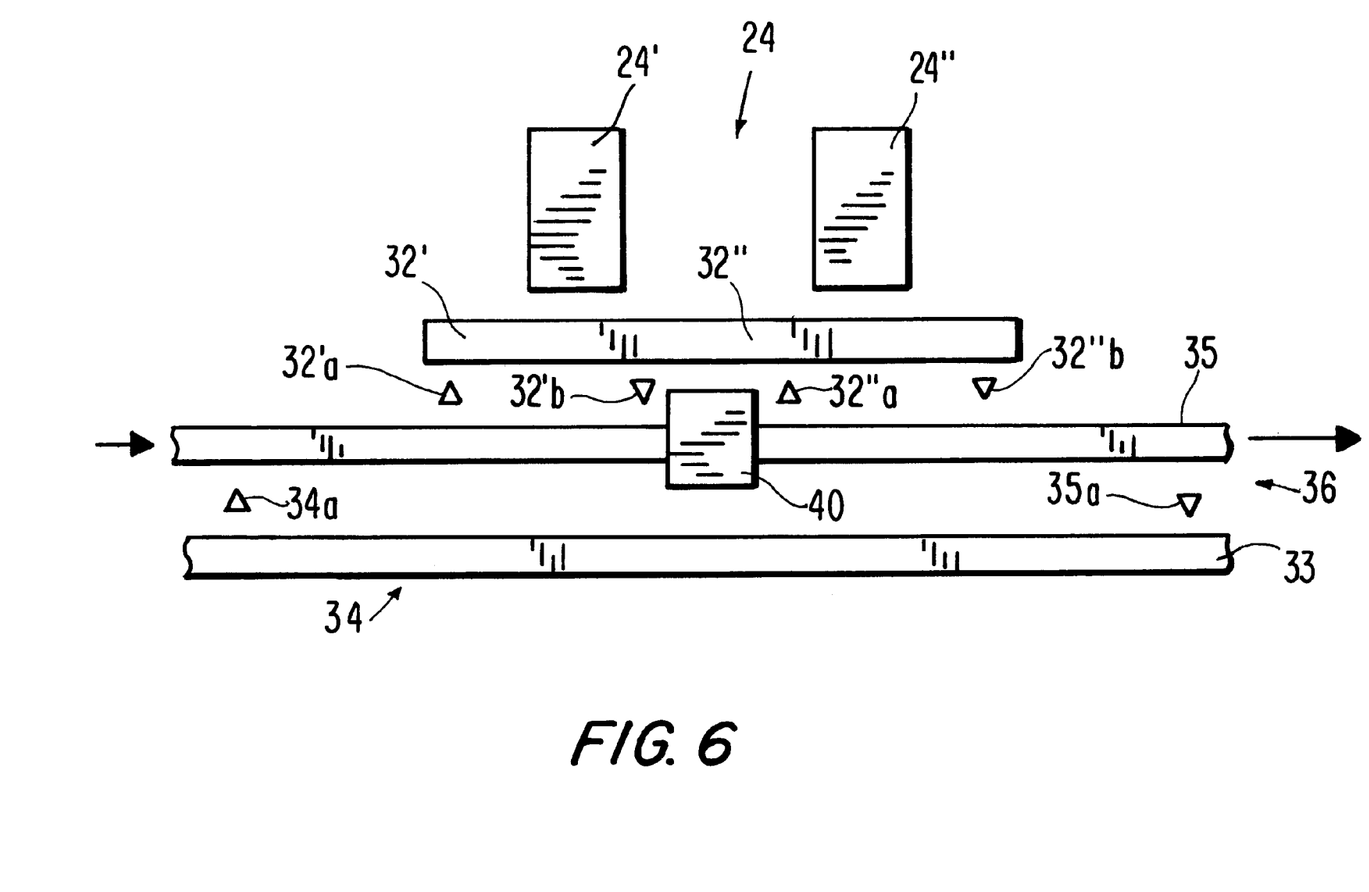
FIG. 6 is a view, similar to FIG. 5, of another embodiment of the invention.

FIG. 6 illustrates another embodiment of the winding station of FIG. 5. Corresponding parts are denoted by the same reference numerals. In this embodiment, second batch components which have been processed by winder 24 are conveyed via conveyor 32', transfer device 32'b and conveyor 35 to a magazine store 40. Here the processed second batch components are detained while the remaining first batch components are processed by the winder 24" as previously described and then dispatched along conveyor 35 to the next processing station downstream. Second batch components may also be stored by local circulation around loop 32, 35, 23, interspersed with the remaining unprocessed first batch components. This embodiment thus can have greater local storage capacity than that of FIG. 5.

A variation of this embodiment is to locate the magazine store 40 downstream of transfer device 35a, while still operationally part of the processing station 24. With such an arrangement, the line must be controlled such that it is known how many first batch components remain in the processing station 24 when the leading second batch component reaches the store 40. Then when that number of first batch components have been counted past the store 40, the second batch components can be released to the next downstream station.

It will be appreciated that instead of or in addition to providing each pallet with a memory or information storage device to which local station-specific sensors respond, the system can instead be controlled by a CPU which maintains an overall knowledge of the position and state of every pallet and component in process.

It will be understood that the foregoing is only illustrative of the principles of the invention, and that various modifications can be made by those skilled in the art without departing from the scope and spirit of the invention. The described embodiments are presented for the purpose of illustration rather than limitation, and the present invention is limited only by the claims which follow.

What is claimed is:

1. A method of converting a manufacturing line for dynamo-electric machine components from manufacturing a first batch of components having a first configuration to manufacturing a second batch of components having a second configuration, the line comprising a plurality of processing stations, at least one of which performs a first processing step on first batch components and a second processing step on second batch components, means for conveying the components a synchronously from station to station in a predetermined sequence of stations, and means for identifying at least a leading component of the second batch of components being conveyed, the method comprising:

conveying the second batch components to said one station while said first batch components are present at said one station; and conveying the second batch components upon which the second processing step has been performed from said one station only when all first batch components have been conveyed away from said station.

2. The method defined in claim 1 further comprising performing the first processing step at a first machine of said one station while directing the second batch components to a further machine of said one station.

3. The method defined in claim 2 further comprising storing the second batch components by locally circulating the second batch components around the said one station.

4. The method defined in claim 2, further comprising converting said further machine of said one station to perform the second processing step upon an approach to said one station of the leading second batch component.

5. The method defined in claim 1 further comprising locally circulating unprocessed first batch components around the said one station until the first processing step has been performed on all of the unprocessed first batch components.

6. The method defined in claim 5 further comprising monitoring a ratio of first batch components to second batch components in said local circulation, and conveying processed second batch components from said one station only when the ratio is zero.

7. The method defined in claim 6 wherein the said one station comprises two machines, the method further comprising adjusting a first machine to perform the second processing step when the ratio is zero, and then directing second batch components to both said machines.

8. The method defined in claim 6 wherein the said one station comprises at least two of said first machines, the method further comprising successively adjusting said first machines to perform the second processing step as the said ratio falls below successive threshold values, the lowest of which is zero.

9. The method defined in claim 1 further comprising storing second batch components on which the second processing step has been performed until all the first batch components have been conveyed from the said one station.

10. The method defined in claim 9 further comprising storing the processed second batch components in a store located downstream of the said one processing station but before a next processing station.

11. The method defined in claim 9 further comprising Storing the processed second batch components at the said one station.

12. The method defined in claim 1 wherein the conveying means comprises a conveyor having pallets on which the components are carried, wherein the conveying the second batch components comprises conveying said components on said pallets.

13. The method defined in claim 12 wherein the means for identifying at least a leading component of the second batch of components being conveyed comprises an information storage device on at least the pallet carrying the leading second batch component, wherein the conveying the second batch components further comprises conveying said information storage device with said second batch components.

14. The method defined in claim 12 wherein a component is removed from its pallet at one of the stations for a processing step to be performed, and is thereafter returned to a different pallet, the method further comprising conveying to said station at least one empty pallet in advance of the pallet conveying the leading component of the second batch of returning a processed first batch component to the empty pallet and conveying the processed first batch component away from the said station.

15. The method defined in claim 1, further comprising converting each station which requires conversion to perform its respective second processing step on second batch components, the converting of each station being effected in response to the approach of the leading second batch component to said station.

16. The method defined in claim 15 wherein the conveying means comprises a conveyor having pallets on which the components are carried and the line comprises an automatic pallet adjustment station, the method further comprising converting the line to process second batch components being initiated by a command to the pallet adjustment station to convert pallets arriving at said station to convey second batch components.

17. The method defined in claim 1 further comprising storing the second batch components adjacent an approach to the said one station while performing the first processing step on the first batch components.

18. A method of converting a manufacturing line for dynamo-electric machine components from manufacturing a first batch of components having a first configuration to manufacturing a second batch of components having a second configuration, the line comprising a plurality of processing stations, wherein one of the processing stations includes a plurality of machines configured to perform a first processing step on the first batch components and a second processing step on the second batch components, the method comprising:

conveying the second batch components to the one station while the first batch components are undergoing the first processing step at the one station;

identifying at least a leading component of the second batch of components being conveyed; and conveying the second batch components upon which the second processing step has been performed away from the one station only when all first batch components have been conveyed away from the one station.

19. The method defined in claim 18 further comprising performing the first processing step at a first machine of the one station while directing the second batch components to a further machine of the one station.

20. The method defined in claim 19, further comprising converting the further machine of the one station to perform the second processing step upon an approach to the one station of the leading second batch component.

21. The method defined in claim 18 further comprising locally circulating unprocessed first batch components around the one station until the first processing step has been performed on all of the unprocessed first batch components.

22. The method defined in claim 21 further comprising monitoring a ratio of first batch components to second batch components in the local circulation, and conveying processed second batch components from the one station only when the ratio is zero.

23. The method defined in claim 22 wherein the one station comprises two machines, the method further comprising adjusting a first machine to perform the second processing step when the ratio is zero, and then directing second batch components to both the machines.

24. The method defined in claim 23 wherein the one station comprises at least two of the first machines, the method further comprising successively adjusting the first machines to perform the second processing step as the ratio falls below successive threshold values, the lowest of which is zero.

25. The method defined in claim 18 further comprising storing second batch components on which the second processing step has been performed until all the first batch components have been conveyed away from the one station.

26. The method defined in claim 25 further comprising storing the processed second batch components in a store located downstream of the one processing station but before a next processing station.

27. The method defined in claim 25 further comprising storing the processed second batch components at the one station.

28. The method defined in claim 25 further comprising storing the second batch components by locally circulating the second batch components around the one station.

29. The method defined in claim 18 wherein the components are conveyed on pallets using a conveyor.

30. The method defined in claim 29 wherein the leading component of the second batch is identified with an information storage device on the pallet carrying the leading batch component.

31. The method defined in claim 29 wherein a component is removed from its pallet at a given station for a processing step to be performed, and is thereafter returned to a different pallet, the method further comprising conveying to the given station an empty pallet in advance of the pallet conveying the leading component of the second batch, returning a processed first batch component to the empty pallet, and conveying the processed first batch component away from the given station.

32. The method defined in claim 18, further comprising converting each station which requires conversion to perform its respective second processing step on second batch components, wherein the converting of each station which requires conversion occurs in response to the approach of the leading second batch component to that station.

33. The method defined in claim 32 wherein the components are conveyed on pallets using a conveyor and wherein the line comprises an automatic pallet adjustment station, the method further comprising converting the line to process second batch components being initiated by a command to the pallet adjustment station to convert pallets arriving at that station to convey second batch components.

* * * * *